United States Patent [19]

Laimbock

[11] Patent Number: 4,683,855
[45] Date of Patent: Aug. 4, 1987

[54] MULTIPLE VALVE ENGINE
[75] Inventor: Franz Laimbock, Graz, Austria
[73] Assignee: Yamaha, Japan
[21] Appl. No.: 765,002
[22] Filed: Aug. 12, 1985
[30] Foreign Application Priority Data Aug. 16, 1984 [JP] Japan ................. 59-169902

[51] Int. Cl.⁴ .............................. F02B 29/00
[52] U.S. Cl. ..................... 123/432; 123/336
[58] Field of Search ............ 123/432, 336, 308
[56] References Cited
U.S. PATENT DOCUMENTS

| | | | |
|---|---|---|---|
| 4,494,504 | 1/1985 | Yagi et al. | 123/432 |
| 4,497,288 | 2/1985 | Nakano et al. | 123/432 |
| 4,508,189 | 4/1985 | Kato | 123/432 |
| 4,549,510 | 10/1985 | Miyakoshi et al. | 123/432 |

Primary Examiner—William A. Cuchlinski, Jr.
Attorney, Agent, or Firm—Ernest A. Beutler

[57] ABSTRACT

An induction system for an internal combustion engine for improving running throughout the entire engine speed and load ranges. The induction system comprises a first intake passage that serves the chamber through a first intake port and a second intake passage that serves the chamber through second and third intake ports. The effective cross-sectional area of the first intake passage is substantially smaller than that of the second intake passage and staged throttle valves are incorporated so that the charge requirements at low speed are supplied primarily through the first intake passage.

12 Claims, 14 Drawing Figures

MULTIPLE VALVE ENGINE

BACKGROUND OF THE INVENTION

This invention relates to a multiple valve engine and more particularly to an improved induction system for an internal combustion engine having multiple intake valves.

It is well known that the specific output of an internal combustion engine can be increased by using two or more intake valves for each combustion engine rather than the more conventional single intake valve. The use of multiple intake valves provides a greater valve opening area than with a single valve and also permits higher running speed due to the lower inertia of the multiple, but smaller valves. Thus, it is common practice to employ two or sometimes even three intake valves per chamber for high performance engines.

The advantages of multiple intake valves can also be enjoyed with more conventional power plants such as those utilized to propel normal automobiles or motorcyles of other than the high performance type. However, the use of multiple intake valves of the type previously proposed tends to provide extremely poor running under slow speed conditions. The reason for this is that the gas velocity through the induction tract is very slow at low engine speeds and fuel has a tendency to condense on the induction passages and within the combustion chamber. In addition, the flow of the intake charge into the combustion chamber is very sluggish and this results in very slow flame travel and incomplete combustion.

It is, therefore, a principal object of this invention to provide an improved induction system for an internal combustion engine that will improve its performance throughout the entire engine load and speed ranges.

It is another object of this invention to provide an induction system for a multiple intake valve engine that provides good running characteristics at low speeds.

SUMMARY OF THE INVENTION

This invention is adapted to be embodied in an induction system for an internal combustion engine comprising a variable volume chamber, a first intake passage communicating with the chamber through a first intake port and a second intake passage communicating with the chamber through second and third intake ports. In accordance with the invention, the first intake passage has a substantially smaller effective cross-sectional area than the second intake passage.

DETAILED DESCRIPTION OF THE PREFERRED EMBODIMENT

Figure 1:
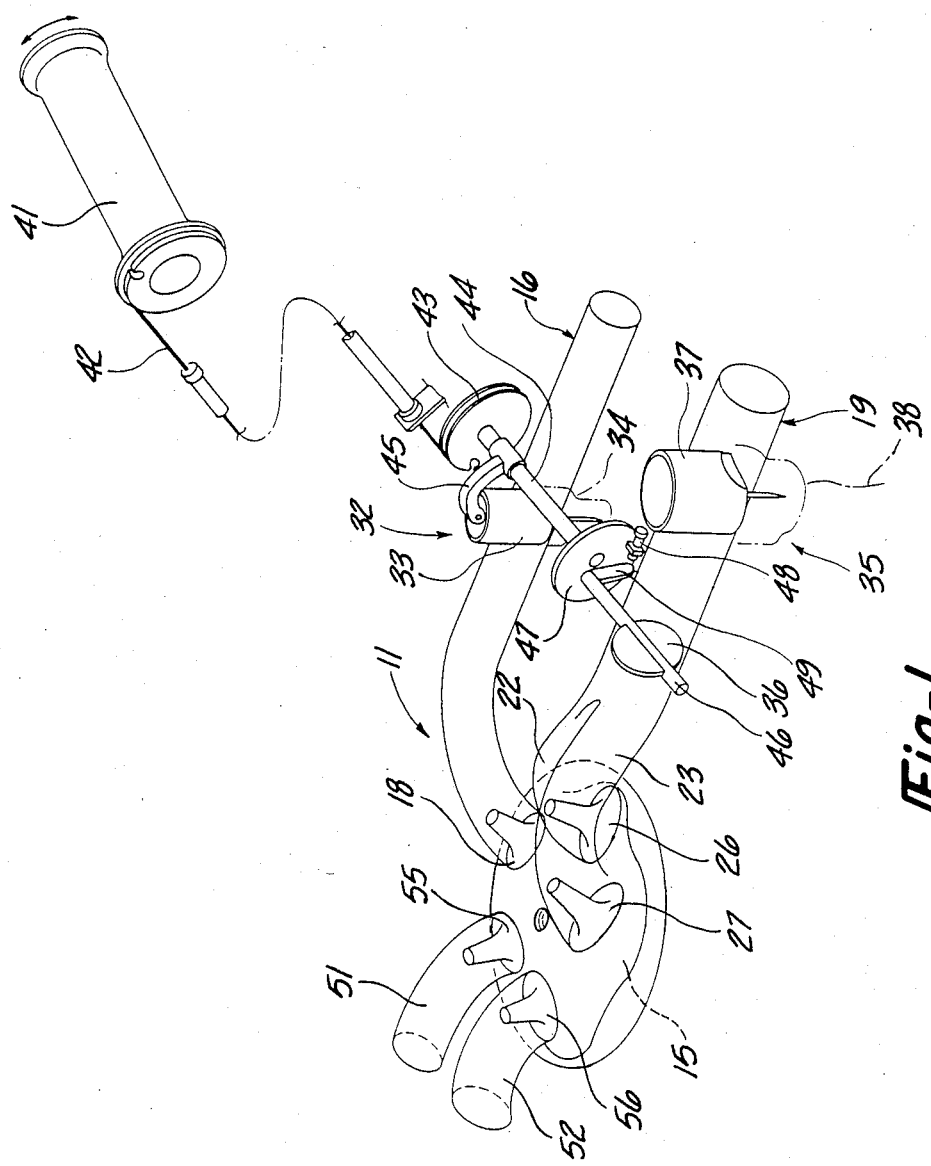
FIG. 1 is a partially schematic view of a portion of an internal combustion engine having an induction system constructed in accordance with an embodiment of the invention.
Figure 2:
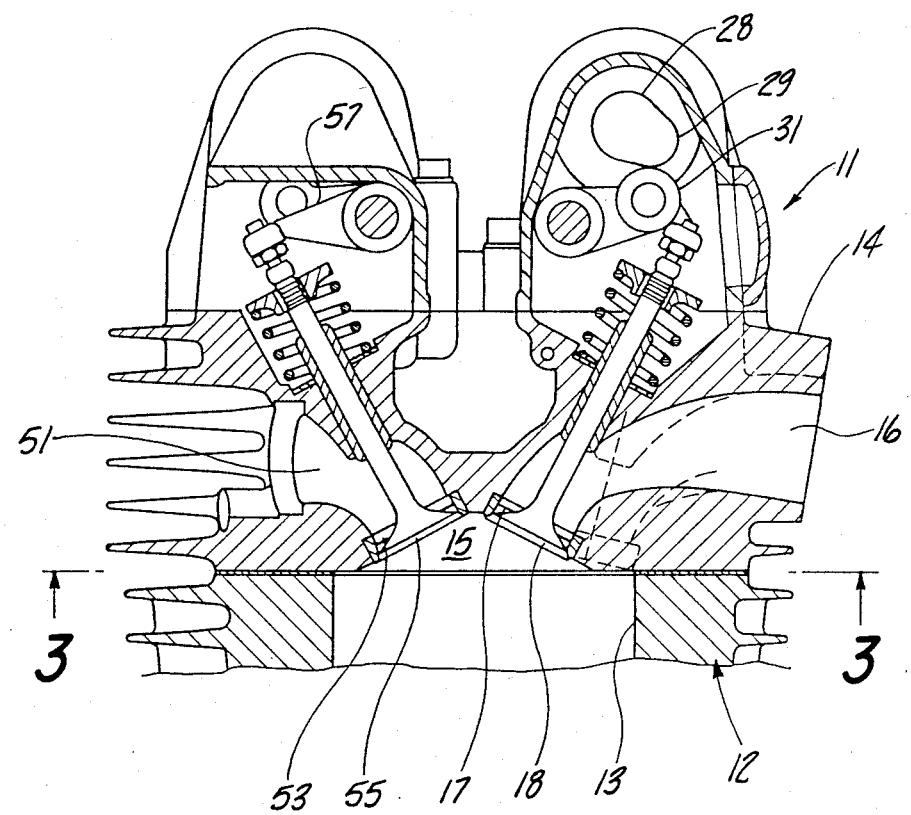
FIG. 2 is a cross-sectional view taken through the engine on a plane containing the axis of the cylinder bore.
Figure 3:
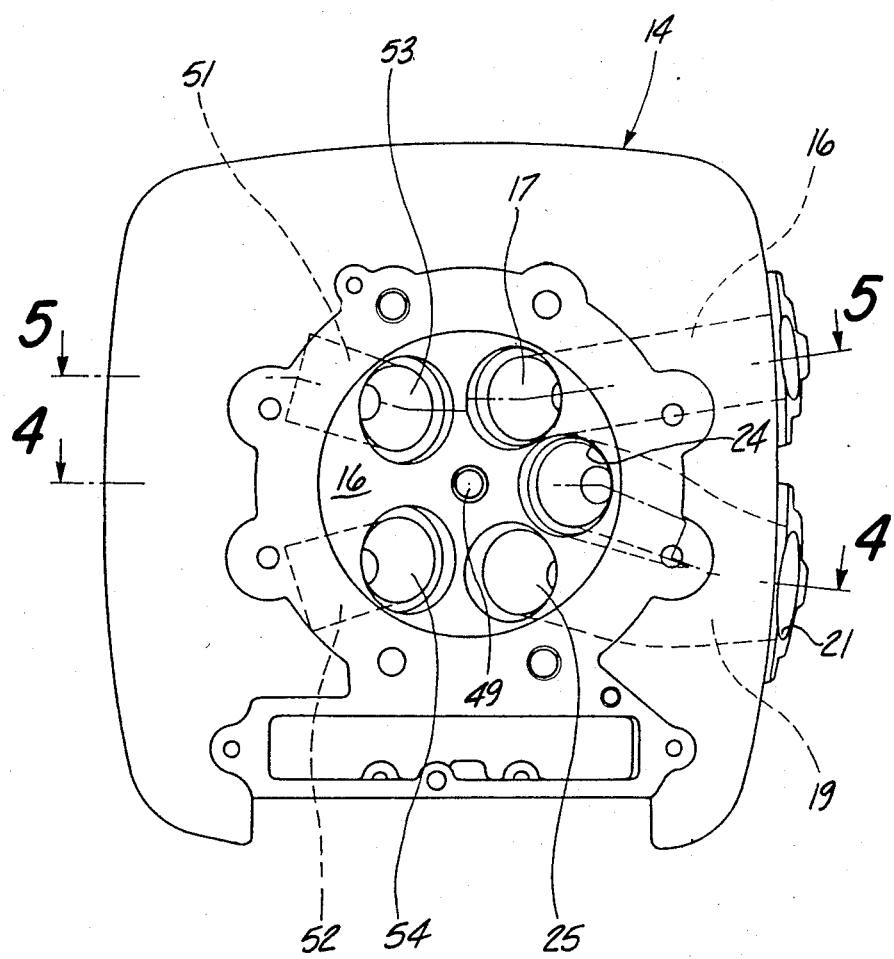
FIG. 3 is a bottom plan view showing the lower face of the cylinder head and is taken generally along the line 3—3 of FIG. 2.
Figure 4:
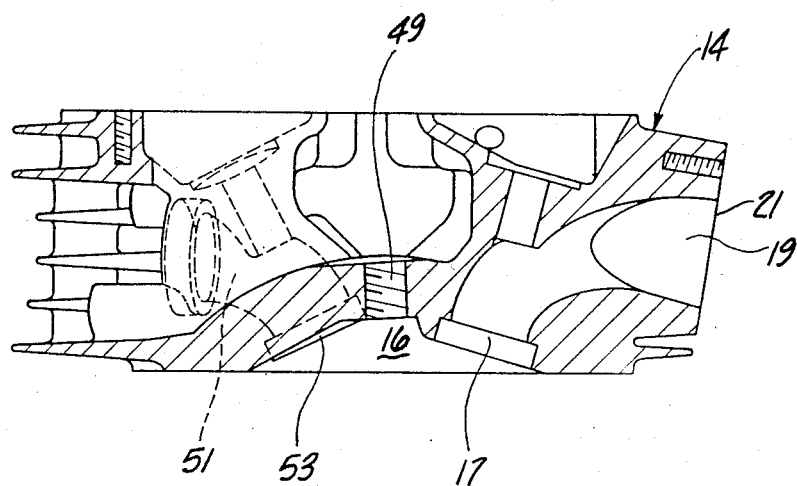
FIG. 4 is a cross-sectional view taken along the line 4—4 of FIG. 3.
Figure 5:
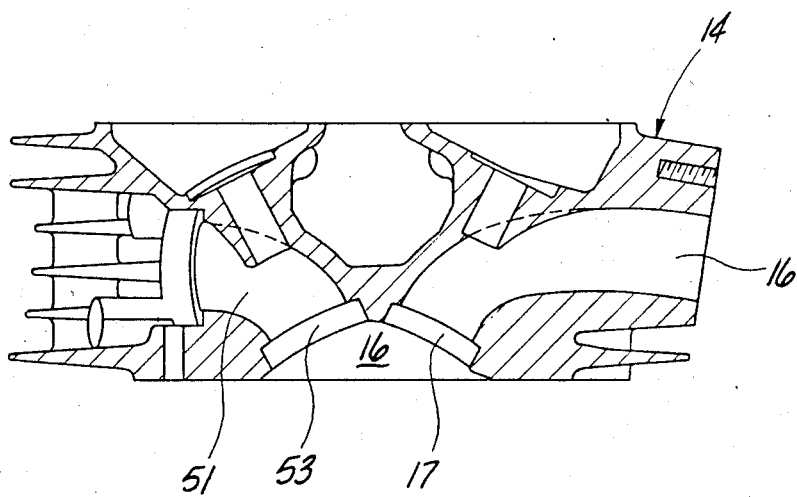
FIG. 5 is a cross-sectional view taken along the line 5—5 of FIG. 3.
Figure 6:
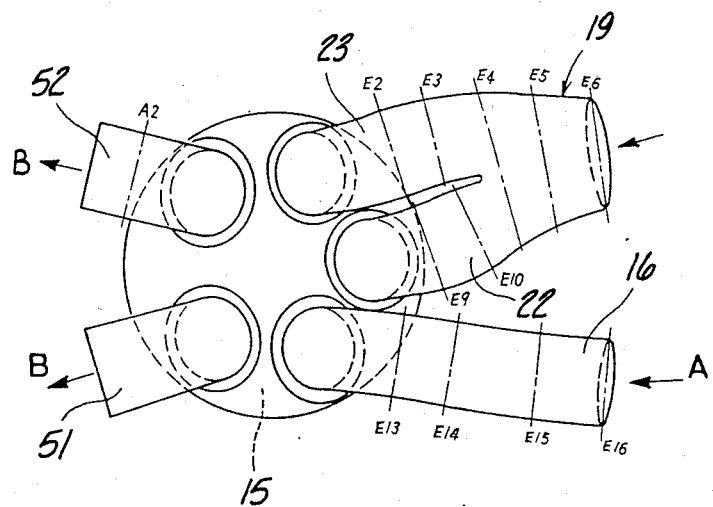
FIG. 6 is a schematic top plan view showing the configuration of the intake and exhaust passages.
Figure 7:
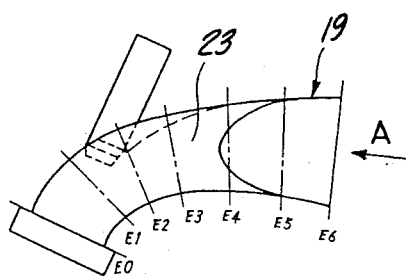
FIG. 7 is a side elevational view of a portion of one of the intake passages.
Figure 8:
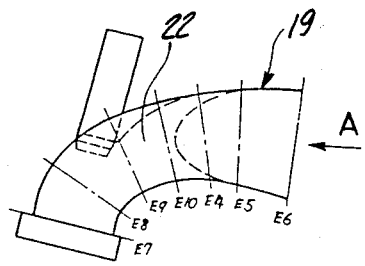
FIG. 8 is a slide elevational view of another portion of that one intake passage.
Figure 9:
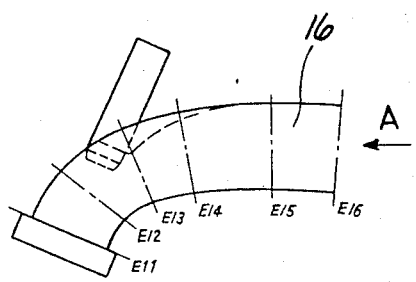
FIG. 9 is a side elevational view of the other of the intake passages.
Figure 10:
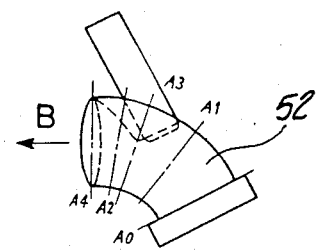
FIG. 10 is a typical side elevational view of one of the exhaust passages.

An internal combustion engine having an induction system constructed in accordance with an embodiment of the invention is identified generally by the reference numeral 11. Inasmuch as the invention relates primarily to the induction system for the engine 11, only this portion of the engine has been illustrated and will be described in detail. Also, for the same reason, only a single cylinder has been illustrated and will be described. It should be understood, however, that the invention is capable of use in engines having multiple cylinders and any type of cylinder configuration.

The engine 11 includes a cylinder block 12 having a cylinder bore 13 in which a piston (not shown) reciprocates and which is connected by means of a connecting rod (not shown) to a crankshaft for driving the crankshaft in a known manner.

A cylinder head 14 is affixed to the cylinder block 12 in a known manner and is provided with a chamber 15 that cooperates with the cylinder bore 13 and piston so as to provide a chamber of volume which cyclically varies and which will at times hereinafter be referred to as the combustion chamber. A primary induction passage, indicated generally by the reference numeral 16 is formed both in the cylinder head 14 and in an associated intake manifold, which appears only in a schedmatic fashion in FIG. 1, and which terminates at an intake port in the cavity 15. This intake port is defined by a value seat 17. A first intake valve 18 is supported for reciprocation by the cylinder head assembly 14 in a known manner and controls the flow through the primary intake passage 16 into the combustion chamber 15.

The cylinder head 14 and associated intake manifold is provided with a secondary induction passage 19 that has a single entrance opening 21 formed in the outer face of the cylinder head 14 and which branches into two portions 22 and 23 each of which terminates in a respective intake port defined by valve seats 24 and 25. Intake valves 26 and 27 are supported by the cylinder head assembly 14 and control the flow through the secondary induction passage 19 and the respective intake ports defined by the valve seats 24 and 25.

Each of the intake valves 18, 26 and 27 is operated by means of an overhead mounted camshaft 28 that has lobes 29 that cooperate with finger followers 31 for actuating the intake valves 18, 26 and 27 simultaneously. Alternatively, the intake valves 18 and 26 and 27 may be operated in a stages sequence.

The primary intake passage 16 is provided with a charge former in the form of a piston type carburetor 32 of a known type. The carburetor 32 has not been shown in full but only the throttle valve portions have been illustrated which includes a sliding piston 33 that is coupled to a metering needle that cooperates with a jet in the fuel bowl 34 of the carburetor 32 for controlling the fuel flow through the primary intake passage 16 in proportion to the effective size of the air opening provided by the position of the piston 33.

In a similar manner, a charge former 35 is provided for supplying a charge to the secondary induction passage 19. The charge former 35 may be of the known air valve carburetor type and includes a downstream manually operated throttle valve 36. Upstream there is provided a floating piston 37 that assumes a position so as to maintain a constant pressure drop across the induction passage 19. A metering rod affixed to the piston 37 cooperates with a metering jet in the fuel bowl 38 of the carburetor 37 for varying the fuel flow.

The position of the throttle valves comprising the piston 33 and butterfly type throttle valve 36 is controlled by a suitable staged accelerator mechanism. In the illustrated embodiment, the engine 11 is adapted to be embodied in a motorcycle and, for that reason, a hand throttle grip 41 is rotatably journaled on one of the handlebars. An accelerator cable 42 interconnects the throttle grip 41 with a drum 43 that is affixed to a throttle valve shaft 44 of the carburetor 32. This throttle valve shaft carries an actuating lever 45 that engages and operates the piston 33 so as to control its position.

Means including a lost motion connection are provided for connecting the throttle shaft 44 with a throttle valve shaft 46 to which the throttle valve 36 of the carburetor 35 is provided. This includes a drum or disk 47 that is affixed to the throttle shaft 44 and which carries an adjustable stop 48. The stop 48 is normally spaced from a lever 49 that is affixed to the shaft 46 when the engine 11 is in its idling condition. As the throttle valve 33 is progressively opened, a point will be reached when the adjustable stop 48 contacts the lever 49 and the throttle valve 36 will then be progressively opened. The reason for this will be explained now.

Figure 11:
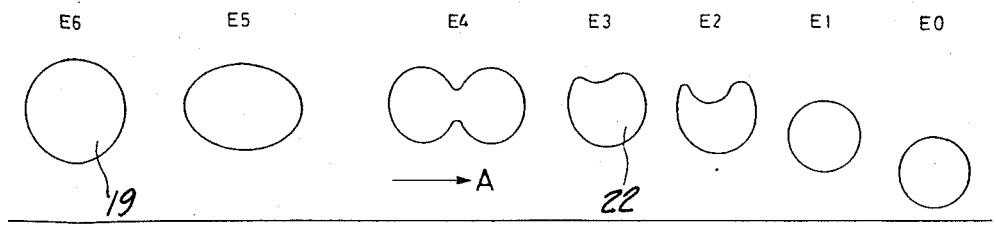
FIG. 11 is a series of cross-sectional views taken along the lines E0 through E6 of FIG. 6 and 7.
Figure 12:
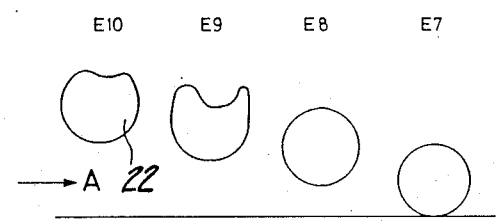
FIG. 12 is a series of cross-sectional views taken along the lines E7 through E10 of Figures and 8.
Figure 13:
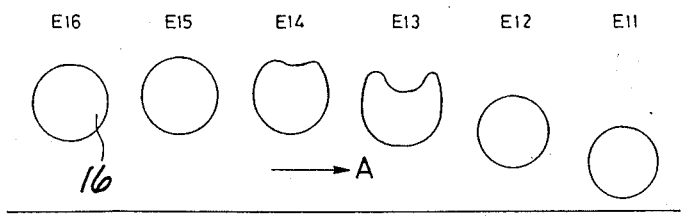
FIG. 13 is a series of cross-sectional views taken along the lines E11 through 16 of FIGS. 6 and 9.

FIGS. 11, 12 and 13 show the size and configuration of the induction passages 16 and 19. FIGS. 11 and 12 show the induction passage 16 and its branch portions 22 and 23 while FIG. 13 shows the induction passage 19. The cross-sectional areas at sections taken along their length progressing from the inlet ends on the outer side of the cylinder head 14 to the inlet ports 17, 24 and 25 is shown in the direction of the arrow A. It will be noted that the primary intake passage 16 has a substantially smaller effective area at its inlet end than does the secondary induction passage 19. The passages 16 and 19 are configured, however, so that the inlet ports 17, 24 and 25 are all the same diameter so that the intake valves 18, 26 and 27 may all have the same diameter. This lends a greater simplicity to the engine construction and arrangement. However, due to the throttling arrangement of the staged throttle valves already described, when the engine is operating at idle and low speeds, the total effective induction area will be only that of the primary induction passage 16 and the small cross-sectional area will insure a high gas velocity in the induction passage 16 and into the combustion chamber 15 so as to insure good vaporization of the fuel and considerable turbulence in the combustion chamber 15 so as to promote rapid flame propagation.

As the throttle valve 36 begins to open, however, there will be increased flow through the induction passage 19 and into the chamber 15 through the intake valves 26 and 27 so that there will be good breathing and maximum power output can be achieved.

A spark plug opening 49 is formed centrally in the combustion chamber 16 to receive a spark plug with its gap at substantially the center of the combustion chamber 16. This is utilized to fire the charge within the combustion chamber 16 in a known manner.

It should be noted that the intake ports 17, 24 and 25 lie substantially on one side of a plane containing the axis of the cylinder bore 13 and spark plug 49. A pair of exhaust passages 51 and 52 are formed in the cylinder head 14 on the other side of this plane. The passages 51 and 52 terminate in respective exhaust ports that are defined by exhaust valve seats 53 and 54. Exhaust valves 55 and 56 are supported by the cylinder head 14 and control the flow through the exhaust ports 53 and 54 and exhaust passages 51 and 52. Like the intake valves 18, 26 and 27, the exhaust valves 55 and 56 are operated by means of an overhead mounted camshaft having lobes that engage finger followers 57 for operating these valves in a known manner.

Figure 14:
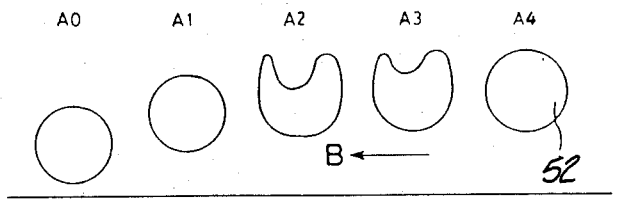
FIG. 14 is a series of cross-sectional views taken along the lines A0 through A4 of FIGS. 6 and 10.

As may be seen in FIG. 14, the exhaust passages 52 have a configuration that provides a substantially constant flow area throughout their length. The exhaust ports 53 and 54 are of the same diameter so that exhaust valves of the same size may be utilized.

It should be readily apparent from the foregoing description that an induction system has been described that provides extremely good running throughout the engine load and speed ranges and which is still capable of obtaining maximum power due to its large effective cross-sectional area. However, the use of the two induction passages of different sizes and the staged throttle valve arrangement, there will be good velocities and rapid combustion even at low speeds.

Although an embodiment of the invention has been illustrated and described, various changes and modifications may be made without departing from the spirit and scope of the invention, as defined by the appended claims.

I claim:

1. An induction system for an internal combustion engine comprising a variable volume chamber, a first intake passage communicating with said chamber through a first intake port, and a second intake passage communicating with said chamber through second and third intake ports, said first intake passage having a substantially smaller effective cross-sectional area than said second intake passage.

2. An induction system as set forth in claim 1 wherein the intake ports are all the same size.

3. A induction system as set forth in claim 2 further including poppet valve means received in each of the intake ports for controlling the flow therethrough.

4. An induction system as set forth in claim 3 further including throttle valve means for controlling the flow through the intake passages so that substantially all of the idle and low speed charge requirements of the chamber are supplied through the first intake passage and the wide open throttle requirements are provided by the first and second intake passages.

5. An induction system as set forth in claim 4 wherein the throttle valve means comprises a throttle valve in each of the induction passages.

6. An induction system as set forth in claim 4 further including a first charge former for supplying a charge to the first intake passage and a second charge former for supplying a charge to the second intake passage.

7. An induction system as set forth in claim 6 wherein the charge formers have respective throttle valves and the throttle valves are operated in the staged sequence.

8. An induction system as set forth in claim 1 further including throttle valve means for controlling the flow through the intake passages so that substantially all of the idle and low speed charge requirements of the chamber are supplied through the first intake passage and the wide open throttle requirements are provided by the first and second intake passages.

9. An induction system as set forth in claim 8 wherein the throttle valve means comprises a throttle valve in each of the induction passages.

10. An induction system as set forth in claim 8 further including a first charge former for supplying a charge to the first intake passage and a second charge former for supplying a charge to the second intake passage.

11. An induction system as set forth in claim 10 wherein the charge formers have respective throttle valves and the throttle valves are operated in the staged sequence.

12. An induction system as set forth in claim 1 further including poppet valve means received in each of the intake ports for controlling the flow therethrough.

* * * * *